United States Patent
Mendelev et al.

(10) Patent No.: US 9,438,617 B2
(45) Date of Patent: Sep. 6, 2016

(54) APPLICATION SECURITY TESTING

(71) Applicant: Hewlett-Packard Development Company, L.P., Houston, TX (US)

(72) Inventors: Kirill Mendelev, Atlanta, GA (US); Matias Madou, Diegem (BE); Sam Ng Ming Sum, Hong Kong (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/431,996

(22) PCT Filed: Sep. 28, 2012

(86) PCT No.: PCT/US2012/057691
§ 371 (c)(1),
(2) Date: Mar. 27, 2015

(87) PCT Pub. No.: WO2014/051597
PCT Pub. Date: Apr. 3, 2014

(65) Prior Publication Data
US 2015/0264074 A1    Sep. 17, 2015

(51) Int. Cl.
*H04L 29/06* (2006.01)
*G06F 11/36* (2006.01)
*G06F 21/52* (2013.01)
*G06F 21/56* (2013.01)

(52) U.S. Cl.
CPC ....... *H04L 63/1433* (2013.01); *G06F 11/3672* (2013.01); *G06F 21/52* (2013.01); *G06F 21/566* (2013.01); *H04L 63/20* (2013.01)

(58) Field of Classification Search
None
See application file for complete search history.

(56) References Cited

U.S. PATENT DOCUMENTS 5,983,348 A    11/1999  Ji
7,237,265 B2 *  6/2007  Reshef ................. G06F 21/554
                                        709/203

(Continued)

FOREIGN PATENT DOCUMENTS

JP    2002-328896    11/2002
JP    2005-134995     5/2005

(Continued)

OTHER PUBLICATIONS

IBM, "Through the Looking-Glass," Application Security Insider, (Web Page), Nov. 16, 2011, 4 pages, available at http://blog.watchfire.com/wfblog/2011/11/through-the-looking-glass.html.

(Continued)

*Primary Examiner* — Hadi Armouche
*Assistant Examiner* — Malcolm Cribbs
(74) *Attorney, Agent, or Firm* — Hewlett Packard Enterprise Patent Department

(57) ABSTRACT

Example embodiments disclosed herein relate to real-time modification of an application under test (AUT). A security rest is performed on the AUT. A real-time modifier determines that a portion of a function to be executed by the AUT is unsafe. The real-time modifier modifies execution of the AUT to not execute the portion.

19 Claims, 4 Drawing Sheets

(56) References Cited

U.S. PATENT DOCUMENTS

| | | | |
|---|---|---|---|
| 8,141,158 B2 | 3/2012 | Calendino et al. | |
| 8,185,877 B1 | 5/2012 | Colcord | |
| 2003/0056116 A1* | 3/2003 | Bunker, V | H04L 12/2602 726/25 |
| 2004/0123117 A1* | 6/2004 | Berger | H04L 63/1408 713/188 |
| 2005/0273854 A1* | 12/2005 | Chess | G06F 21/577 726/22 |
| 2007/0107057 A1* | 5/2007 | Chander | G06F 21/54 726/22 |
| 2007/0203973 A1* | 8/2007 | Landauer | H04L 12/2697 709/203 |
| 2008/0162687 A1* | 7/2008 | Scott | G06F 17/30902 709/224 |
| 2008/0263671 A1 | 10/2008 | Testa et al. | |
| 2010/0064178 A1 | 3/2010 | Dhulipalla et al. | |
| 2011/0185231 A1 | 7/2011 | Balestrieri et al. | |
| 2013/0311835 A1* | 11/2013 | Dunne | G06F 11/0793 714/47.3 |
| 2014/0007222 A1* | 1/2014 | Qureshi | G06F 21/10 726/16 |
| 2014/0090054 A1* | 3/2014 | Bolzoni | H04L 63/0245 726/22 |

FOREIGN PATENT DOCUMENTS

| | | |
|---|---|---|
| JP | 2005-517220 | 6/2005 |
| JP | 2006-018765 | 1/2006 |
| JP | 2007241906 | 9/2007 |
| JP | 2012-027618 | 2/2012 |
| JP | 4927231 | 5/2012 |
| WO | WO-02097620 A2 | 12/2002 |

OTHER PUBLICATIONS

International Search Report & Written Opinion received in PCT Application No. PCT/US2012/057691, Apr. 26, 2013, 9 pages.

MacDonald, N., "Interactive Application Security Testing," (Web Page), Jan. 30, 2012, 4 pages, available at http://blogs.gartner.com/neil_macdonald/2012/01/30/interactive-application-security-testing/.

* cited by examiner

APPLICATION SECURITY TESTING

BACKGROUND

Software security testing is used to identify vulnerabilities in an application such as a Web application. Traditional black-box security testing for Web-based software works by using a security testing application, often referred to as a scanner, which poses as an attacker. In a black-box approach, the scanner explores an Application Under Test (AUT) by making HTTP requests and evaluating the HTTP responses or the lack thereof in order to find all of the URLs where the AUT accepts input. The URLs where the AUT accepts input may be referred to the attack surface of the AUT. The scanner then creates attacks based on the attack surface and likely categories of vulnerabilities. The scanner applies the attacks to diagnose the presence or absence of vulnerabilities by evaluating the program's HTTP responses.

BRIEF DESCRIPTION OF THE DRAWINGS

The following detailed description references the drawings, wherein.

DETAILED DESCRIPTION

Figure 1:
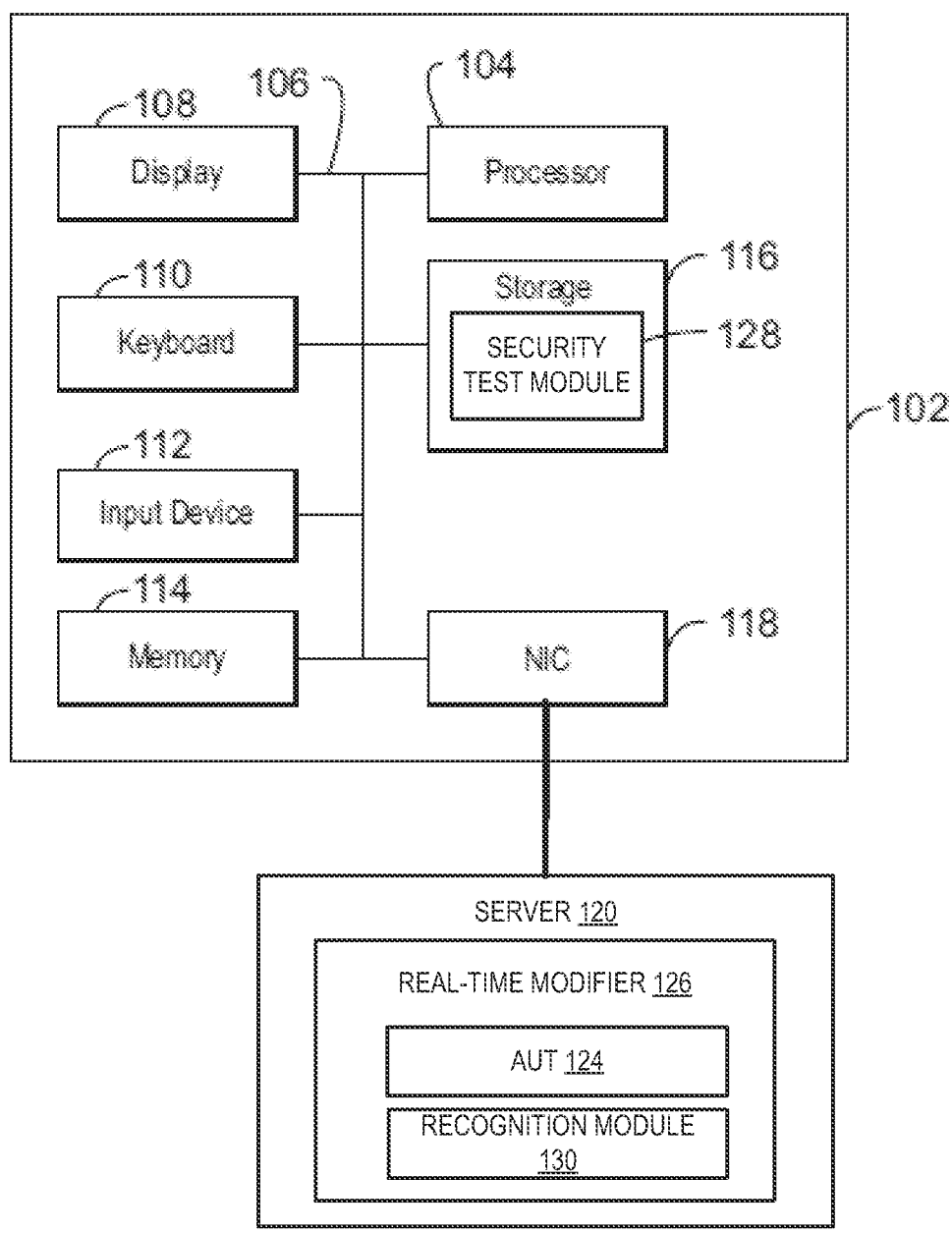
FIG. 1 is a block diagram of a computing system capable of modifying execution of an application under test by determining and modifying unsafe execution, according to one example.

Embodiments described herein provide techniques for performing testing of applications, such as web applications. When a company desires to know how secure a web application the company has in production is or going to be put into production, the company often uses a security testing solution such as a penetration testing solution (e.g., use of a scanner), fuzz testing, vulnerability testing, software security testing, website security testing, combinations thereof, or the like. The company may wish to use a copy of the application in production as an Application Under Test (AUT). A reason to use an application in production or an application that is going to be put into production for testing is that the company may desire to test the same code. Using an AUT that is going to be the application in production at a quality assurance stage ensures that the application used in production has been tested. Throughout this description scanners are referred to, however, it should be noted that other testing solutions may similarly be used.

During dynamic web application scanning, a scanner imitates actions of a user working with the application to discover application attack surfaces and to perform a multitude of attacks on discovered attack vectors. Because scanners are not aware of logic of the application that the scanner is testing, some of those operations may be damaging to the AUT or to its environment.

In one example, during the scan of an enterprise application, the application may send numerous emails to various employees once the scanner discovered a "contact us" page. However, in the point of view of the scanner, the test was just another Hypertext Transfer Protocol (HTTP) POST attack vector.

In another example, the goal of a Denial of Service (DoS) attack is to hang or bring down the application. A penetration testing solution wants to find these vulnerabilities and does that by sending out these attacks that can bring down the application. When succeeding, the application goes down or hangs, which takes away from further testing.

The dangerous and disruptive nature of scans can lead to customers spending a large amount of time sandboxing applications under test. This may not be successful because of the internal complexity of the application and lack of complete knowledge of its functionality. The task of reverting the application back to original state after each scan can be time-consuming and any mistake during the process may lead to inter-scan inconsistencies, confusing the consumer of vulnerability reports. Further, if the AUT's state is disrupted by security testing, the test may fail prematurely, for example, due to the AUT crashing, becoming non-responsive, application logic being skewed by attacks, etc. As such, the security test may fail to find critical vulnerabilities of the AUT because the AUT may fail before such tests are executed.

Accordingly, benefits of the approach introduced herein would include fixing the DoS problem on the fly but still report the problem back to the testing solution and dynamically modifying execution of the AUT to keep the AUT from performing actions deemed unsafe. The approach can ensure that the application stays up and running while it still points out how an attacker may take advantage of any problems in the application. Other damaging or unsafe operations may include wiping database records, modifying database records, polluting databases with multiple records created during application crawling and audit, unexpected operations with a server-side file system, exhaustion of server-side resources (e.g., available sockets), etc.

The AUT can execute in a real-time modifier environment. As such, the outcomes of functions within the AUT can be changed or modified. For example, by instrumenting Application Programming Interfaces (APIs) in the application, the behavior of the AUT can be modified on the fly. For example, if an unsafe procedure is called, the real-time modifier can emulate the procedure's execution without actually performing the dangerous operations. In certain examples, the real-time modifier environment can have access to the APIs employed by the AUT. Examples of real-time modifier solutions can facilitate implementation include Java and .NET frameworks. These frameworks may be used to provide database, email, and communication services to developers.

FIG. 1 is a block diagram of a computing system capable of modifying execution of an application under test by determining and modifying unsafe execution, according to one example. The system is generally referred to by the reference number 100. Those of ordinary skill in the art will appreciate that the functional blocks and devices shown in FIG. 1 may comprise hardware elements including circuitry, software elements including computer code stored on a non-transitory, machine-readable medium, or a combination of both hardware and software elements. Further, the configuration is not limited to that shown in FIG. 1, as any number of functional blocks and devices may be used in embodiments of the present invention. Those of ordinary skill in the art would readily be able to define specific functional blocks based on design considerations for a particular electronic device.

As illustrated in FIG. 1, the system 100 may include a computing device 102, which can include a processor 104 connected through a bus 106 to a presentation device such as a display 108, a keyboard 110, and one or more input devices 112, such as a mouse, touch screen, or keyboard. In an embodiment, the computing device 102 is a general-purpose computing device, for example, a desktop computer, laptop computer, server, and the like. The computing device 102 can also have one or more types of non-transitory, computer readable media, such as a memory 114 that may be used during the execution of various operating programs, including operating programs used in embodiments of the present invention. The memory 114 may include read-only memory (ROM), random access memory (RAM), and the like. The computing device 102 can also include other non-transitory, computer-readable media, such as a storage system 116 for the long-term storage of operating programs and data, including the operating programs and data used in embodiments of the present invention.

In an embodiment, the computing device 102 includes a network interface controller (NIC) 118, for connecting the computing device 102 to a server 120. The computing device 102 may be communicatively coupled to the server 120 through a network, such as the internet, a local area network (LAN), a wide-area network (WAN), or another network configuration. The server 120 may have a non-transitory, computer-readable media, such as storage device, for storing data, buffering communications, and storing operating programs of the server 120. Communications between the computing device 102 and the server 120 may be conducted using a request-response protocol such as the Hyper-Text Transfer Protocol (HTTP) or another API.

The server 120 may be an application server that hosts an AUT 124. The server 120 also includes a real-time modifier 126 that can monitor and/or modify execution of the AUT 124. In certain examples, the real-time modifier 126 acts as an environment for the AUT 124 to execute. The real-time modifier 126 can be implemented using a software framework such as the .NET framework, the Java Virtual Machine, or other similar engines. In other examples, aspect oriented programming or other software may be used. In some examples, the server can be implemented as a computing device such as computing device 500, a laptop, a desktop computer, a workstation, or other computing device.

In one example, Java Virtual Machine instrumentation is used. An API Called Instrument can be used to monitor and/or manage APIs that are called. Here, when a particular API or set of APIs is called, the instrument can substitute code, variables, etc. into execution and/or otherwise modify the execution of the AUT 124. For example, if a part of the API is called, code associated with the real-time modifier can be executed to facilitate choosing of a desired path. Similar approaches can be used in other software frameworks such as .NET. Here, the changes can be performed in memory. As such, the AUT 124 need not be modified directly.

In another example, aspect oriented programming features may be used. APIs to be monitored can be specified. At runtime, changes can be implemented on the fly based on programmed settings.

The computing device 102 may include a security test module 128 such as a scanner, fuzzing, vulnerability tester, etc. that performs a security test against the AUT 124. In one example, a vulnerability tester looks for known vulnerabilities in an AUT 124 and reports potential exposures. In another example, a penetration tester or scanner is a test that looks for ways to exploit a normal course of business associated with the AUT 124. In yet another example, fuzz testing can be a technique that involves providing invalid, unexpected, or random data to inputs of an AUT. The AUT 124 can then be monitored for issues.

The security test module 128 may send HTTP requests to the AUT 124 through the network, wherein the HTTP request is configured to attempt to expose a vulnerability of the AUT 124. The HTTP requests may include HTTPS requests, which combine the Hypertext Transfer Protocol with the SSL (Secure Sockets Layer) and TLS (Transport Layer Security) protocols to provide encrypted communication and secure identification of a network Web server.

During the processing of the HTTP request by the AUT 124, an observer (not shown) can monitor the internal processes performed by the AUT 124. For example, the observer can identify lines of code that are executed by the AUT 124, files that are accessed, database queries that are performed, and the like. Both the observer and the AUT 124 may be configured to communicate with the security test module 128 over a same HTTP channel.

Figure 2:
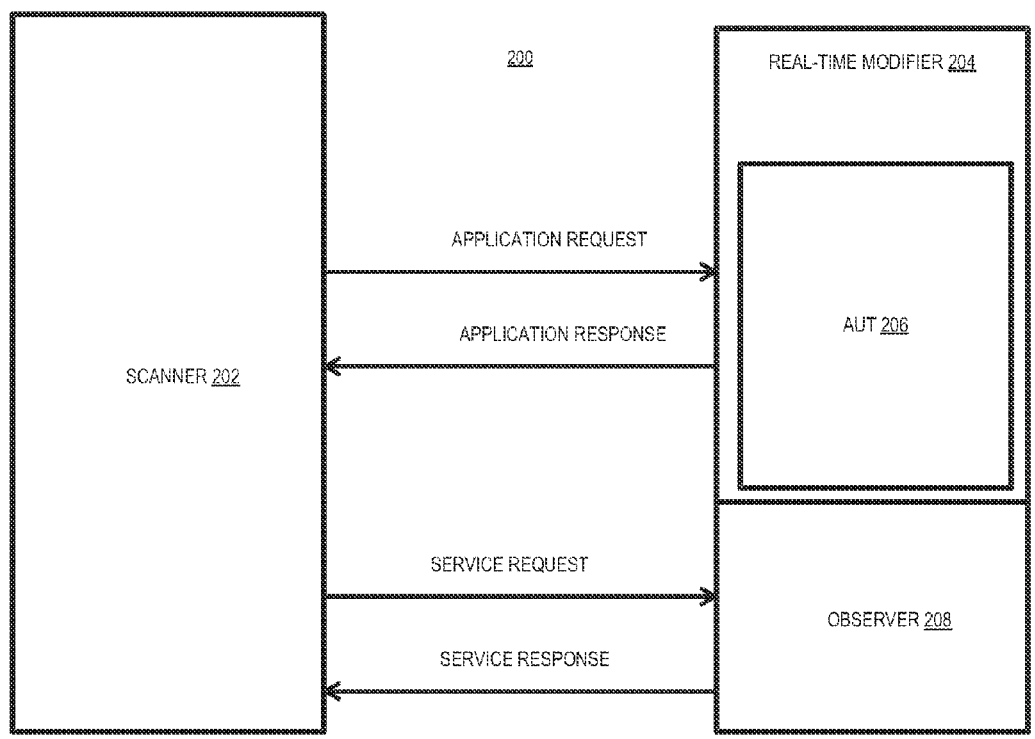
FIG. 2 is a block diagram of showing a testing system configuration capable of modifying execution of an application under test, according to one example.

As described further in reference to FIG. 2, some requests sent from the security test module 128 to the server 120 may target the AUT 124 to elicit a response from the AUT 124 in accordance with its programming. Other requests sent from the security test module 128 to the server 120 may target the observer to obtain additional information regarding the effect that a particular request had on the operations performed by the AUT 124 or other information related to the AUT 124, the observer, or the server 120 hosting the AUT 124. Data received by the security test module 128 in responses to application requests and service requests may be used by the security test module 128 to generate vulnerability reports. Vulnerability reports may be displayed to the user though a user interface provided by the security test module 128.

As noted above, in certain scenarios, the security test module 128 performs a security test on the AUT 124 communicatively coupled to the computing device 102. During the test, the real-time modifier 126 can monitor the execution of the AUT 124 and can be capable of determining whether a function or portion of a function to be executed by the AUT 124 is safe or unsafe. The real-time modifier 126 can determine that a function executed by the AUT 124 is unsafe. Accordingly, in one embodiment, the real-time modifier 126 can modify execution of the AUT 124 by not performing a portion of the function deemed unsafe. In one example, the portion is the entire function. In another example, the portion can be part of the function.

A recognition module 130 can determine whether a function to be called by the AUT 124 is safe or unsafe. In one example, the function or portion can be considered unsafe based on a type of process to be performed by the function and/or portion. In one embodiment, a portion can be considered unsafe if it performs an unwanted action. The unwanted action can be related to communications and/or storage. Further, the unwanted action can be associated with modifying the test bed to make it more difficult to perform additional test. In certain examples, if the type of process used is configured to perform at least one or more of the following: delete a database record, modify another database record, pollute a database, send an outgoing message (e.g., an email, a text message, etc.), exhaust one or more resources of the server 120, or the like, the process can be considered unsafe. In one example, deletion of files on the server 120 can be caused by the result of a successful attack. In another example, removing database entries can be a result of a successful attack. Further, spamming external email boxes and/or text messaging phones can be a result of application surface discovery and attack. Moreover, some unsafe functions can deal with certain attacks that are known to bring the AUT down (e.g., parseDouble in the Java environment).

In another embodiment, the function is considered unsafe based on an API called by the function. In this example, the API can be flagged as unsafe to call. Example APIs can be associated with modification of a database and/or communications to an outside environment.

The real-time modifier 126 can emulate the portion without performing the portion of the function that is deemed unsafe. In one example, this can be done by determining what the response the AUT 124 would make to the security test module 128 and sending that response. As such, a function that calls for an email to be sent to a particular person or entity, for example, a president of a company that has an email address available on a contact page, the portion that controls the email can be modified during execution to not send the email, while sending a response to the security test module 128. The response can include, for example, a confirmation that the email has been sent. Such emulation can be performed for other types of processes considered unsafe by returning expected outcomes without performing the portion(s) deemed unsafe. By preventing disruptive operations from occurring and by keeping the rest of the AUT intact (e.g., by simulating unsafe operation's actions so that high-level code will keep functioning properly) can help ensure the AUT's stability under the security test.

In other scenarios the real-time modifier 126 does not perform the portion of the function deemed unsafe. Instead, the real-time modifier 126 blocks the portion from being executed. In some examples, this can occur by blocking the whole function. In other examples, this can be performed by keeping portions of code from being called or executed, for example, by keeping API calls to I/O, storage, or external communications from being called and/or executed.

Further, in some scenarios, the real-time modifier 126 and/or another portion of the server 120, such as an observer application (which may be included as part of the real-time modifier 126), can report a vulnerability associated with the portion to the security test module 128. As noted above, the security test can be a penetration test. In one example, when an unsafe function is called, the observer can take note of what the likely outcome of the unsafe function would be and record it. If the unsafe function is also a vulnerability, it can be reported. Further, activity of more than one function, when combined, can indicate a vulnerability. For example, multiple calls to the same function may be used to consume too many system resources. As such, in some examples, the real-time modifier 126 and/or observer can perform, as part of emulation, emulation of usage of the server resources.

FIG. 2 is a block diagram of showing a testing system configuration capable of modifying execution of an application under test, according to one example. The system 200 may include a scanner 202, a real-time modifier 204, an AUT 206, and an observer 208.

The AUT 206 may be encoded in any suitable Web-based computer language, such as JAVA, or .NET, among others. The AUT 206 may operate within an suitable software framework, such as Struts, Struts 2, ASP .NET MVC, Oracle WebLogic, and Spring MVC, among others. The software framework includes a set of common code modules that provide generic functionality, which can be selectively overridden or specialized by user code to providing specific functionality. The AUT 206 may be configured to execute one or more instances of a Java Virtual Machine (JVM), Common Language Runtime (CLR), and/or other runtime environment for processing requests from the scanner 202. The programming instructions provided by the common code modules of the software framework or runtime environment may be referred to as container code. The custom programming instructions specific to the AUT 206 may be referred to as user code.

During testing, a scanner 202 can explore the AUT 206 by making HTTP requests and evaluating the HTTP responses or the lack thereof in order to find all of the URLs where the AUT accepts input. A lack of response may provide useful information, for example, information to determine that the tested application has failed and/or the server hosting the application has failed. Even though examples discussed herein are directed to a scanner 202, it is contemplated other security testing engines, modules, and/or techniques can be used.

The AUT 206 includes a network interface (not shown) for enabling communications between the scanner 202 and the AUT 206 through the network. The network interface exposes the attack surface of the AUT 206 and is the same interface that would eventually be used to provide access to the AUT 206 when the AUT 206 is made available for general use. Communication between the scanner 202 and the AUT 206 over the network interface may be conducted through application (e.g., via HTTP) requests issued from the scanner 202 to the AUT 206 and HTTP responses issued from the AUT 206 to the scanner 202. Requests targeting the AUT 206 may be referred to as application requests, and responses received from the AUT 206 may be referred to as application responses. The application requests generated by the scanner 202 may be configured to expose potential vulnerabilities of the AUT 206, to respond to tests posed by the AUT 206, or the like.

The real-time modifier 204 and/or observer 208 can operate within the execution environment of the AUT 206 and has access to the internal operations performed by the AUT 206. For example, the real-time modifier 204 may modify the bytecode of the AUT 206 by injecting additional code, such as a JAVA class, at various program points. The injected code acts as a monitor that observes the AUT 206. The injected monitor code may be located at strategic program points in the AUT 206, for example, application programming interface (API) calls that perform specific operations that may be deemed unsafe, such as modification of a database, communications with outside individuals, or the like.

Communications between the scanner 202 and the observer 208 may be implemented through the use of custom request and response headers. Custom headers may be added to the application requests by the scanner 202, and custom headers may be added to the application responses by the observer 208. In this way, at least some of the communications between the scanner 202 and the observer 208 may be piggy-backed on normal communications with the AUT 206. Using a single channel of communication eliminates any problems with opening a dedicated, secondary channel, and adding HTTP headers typically does not interfere with the normal operation of the AUT 206.

In one example, the scanner 202 performs a test on the AUT 206. Application requests can be sent to the AUT 206 and application responses can be received. The scanner 202 can send application requests and receive responses to find possible security vulnerability areas, for example, locations where input can be provided to the AUT 206. Then, the scanner 202 can attack the locations using attack vectors. The attack vectors can include attempting to cause the AUT 206 to perform unsafe functions.

In one example, the scanner 202 asks the AUT 206 to perform an unsafe function. The real-time modifier 204 can detect that the unsafe function or portion of the function may be called. As such, the real-time modifier 204 can modify execution of the AUT 206 to prevent the unsafe portion from being executed. Examples of such modification are further detailed in FIG. 3 and described above. Further, as noted above, the observer 208 can track calls to the unsafe portions and provide test information and/or analysis to the scanner 202. Moreover, the real-time modifier 204 may emulate responses from the portion without performing unsafe functionality.

The observer 208 may be used to provide the information/ analysis to the scanner 202 to facilitate testing of the AUT 206. The scanner 202 can communicate with the observer 208 by using service requests and responses. The service requests and responses can be implemented using, for example, custom headers.

In some examples, the real-time modifier 204 can also be used to modify other aspects of the AUT 206 during execution. For example, code for debugging can be added to the execution of the AUT 206 if one or more functions or program segments are dynamically compiled. As such, an on-the-fly compiler can compile code with debug information. With this approach, the observer 208 can have access to detailed information about the executed code. The detailed information can be provided to the scanner 202. The scanner 202 can use the debugging information in its testing of the AUT 206.

Figure 3:
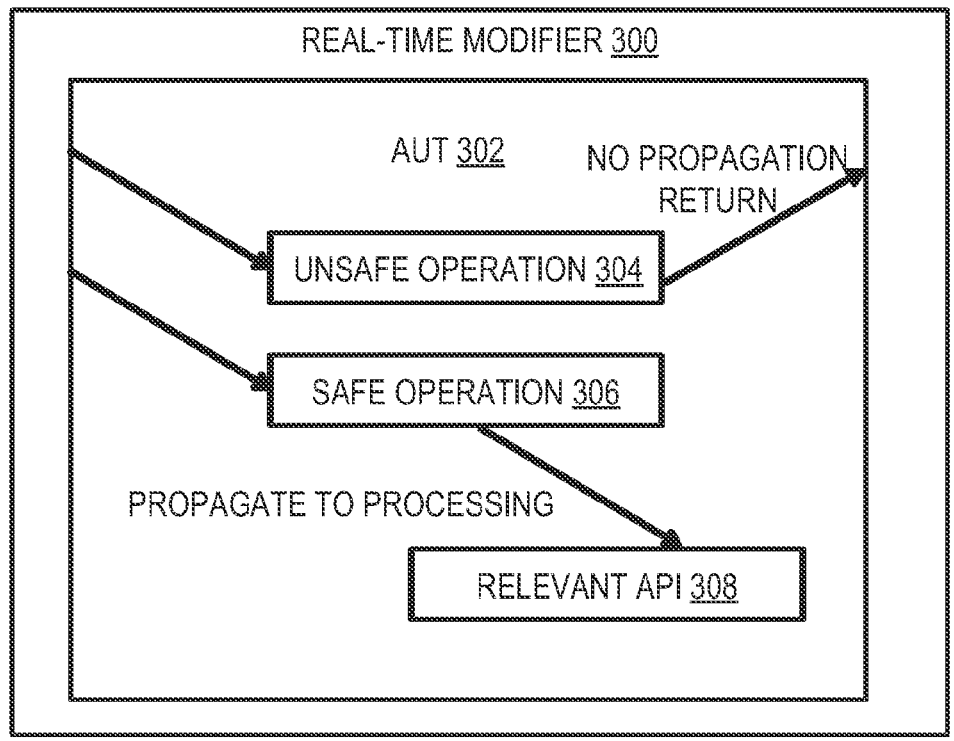
FIG. 3 is a block diagram of showing an example of operations of an application under test being modified based on safety, according to one example.

FIG. 3 is a block diagram of showing an example of operations of an application under test being modified based on safety, according to one example. A real-time modifier 300 can execute an application under test 302. The application can be tested by a security test engine such as a scanner. The AUT 302 can send and receive messages from the security test engine to communicate. Further, the AUT 302 may, via the communications, provide a test such as a validation test. The test can be provided to the security test engine via an API.

During the test, code of the AUT 302 can be executed. When a function or portion of the function is executed, at certain decision points, the real-time modifier 300 can act to determine whether the next operation of the function is safe or unsafe. As noted above, an API Called Instrument or similar tool can be used to monitor and/or manage APIs that are called by the function.

In certain examples, code is executed and the real-time modifier 300 decides whether the operation is safe or unsafe. In one example, the real-time modifier 300 determines that the operation is an unsafe operation 304. Because the operation is unsafe, the real-time modifier 300 changes execution to return without further propagating, hi some examples, the real-time modifier 300 may also insert code to be executed to emulate the unsafe operation without performing it or return an expected value to emulate the unsafe operation. Further, the real-time modifier 300 can provide a report with the information that the unsafe operation was to be performed to the scanner. In another example, the operation can be determined to be a safe operation 306. Because the operation is determined to be safe, the real-time modifier 300 can allow the code to continue to propagate to processing. As such, in the case of calling an API, the relevant safe API 308 can be called.

Figure 4:
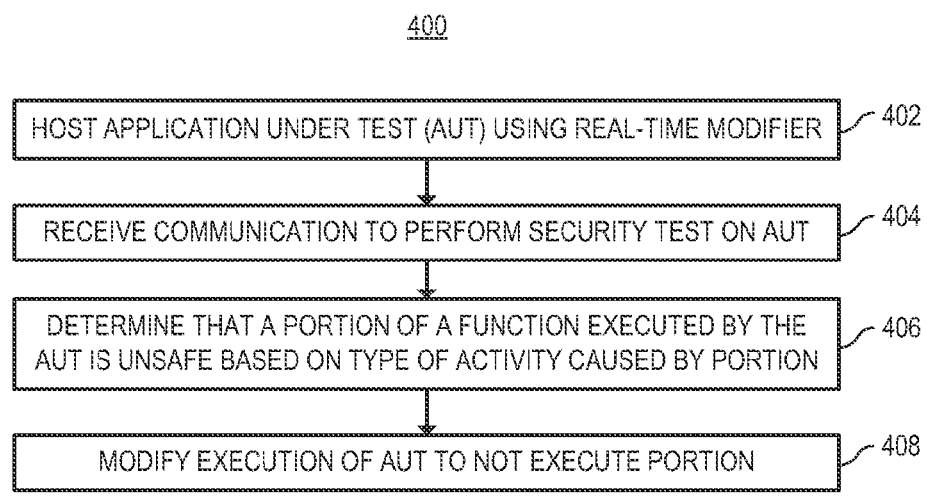
FIG. 4 is a flowchart of a method for modifying execution of an application under test to based on safety of the execution, according to one example.

FIG. 4 is a flowchart of a method for modifying execution of an application under test to based on safety of the execution, according to one example. Although execution of method 400 is described below with reference to computing system 100, other suitable components for execution of method 400 can be utilized (e.g., computing device 500). Additionally, the components for executing the method 400 may be spread among multiple devices. Method 400 may be implemented in the form of executable instructions stored on a machine-readable storage medium, such as storage medium 520, and/or in the form of electronic circuitry.

At 402, a server 120 can host an AUT 124 using a real-time modifier 126. The server 120 can communicate with other devices and/or programs, for example, via a network. In one example, a security test module 128 can be used to communicate with the AUT 124.

The security test module 128 can communicate, using a computing device 102 to perform a security test on the AUT 124. As such, at 404, the server 120 can receive communications from the computing device 102, which can be communicatively coupled to the AUT 124 to perform the security test. As noted, the security test can include a unit test, a penetration test, fuzz testing, vulnerability testing, software security testing, website security testing, combinations thereof, or the like.

During the test, the AUT 124 can perform various tasks, receive communications from the security test module 128, and respond to the security test module 128. In one example, execution of the tasks can lead to a point where the AUT 124 may be prepared to perform a task that the real-time modifier 126 may determine to be unsafe. As such, at 406, a recognition module 130 of the real-time modifier 126 can determine that a portion of a function to be executed by the AUT 124 is unsafe based on a type of activity caused by the portion. In one example, the activity can be pre-flagged as unsafe by a tester. In another example, the activity can be determined to be unsafe based on a set of APIs that are flagged as unsafe by the tester, another person, a developer, etc. The activity can be considered unsafe because it involves a communication with an entity outside of the test, it involves direct modification of a database, it includes a known vulnerability, or otherwise performs an unwanted action. Example actions include polluting a database, rendering the test bed unusable without a restore, sending text messages and/or spam email, etc.

At 408 the real-time modifier 126 can then modify an execution of the AUT 124 to no execute the portion. As noted above, the modification can include immediately returning without executing the portion, replacing the portion with other code, returning expected results, emulating the portion without performing the unsafe operation, or the like. As such, in certain scenarios, the real-time modifier 126 can emulate a functionality or multiple functionalities of the portion to provide a response to the security test. Moreover, as noted above, the server, for example, using an observer, can monitor and/or report one or more vulnerabilities caused by the portion to the security test.

Figure 5:
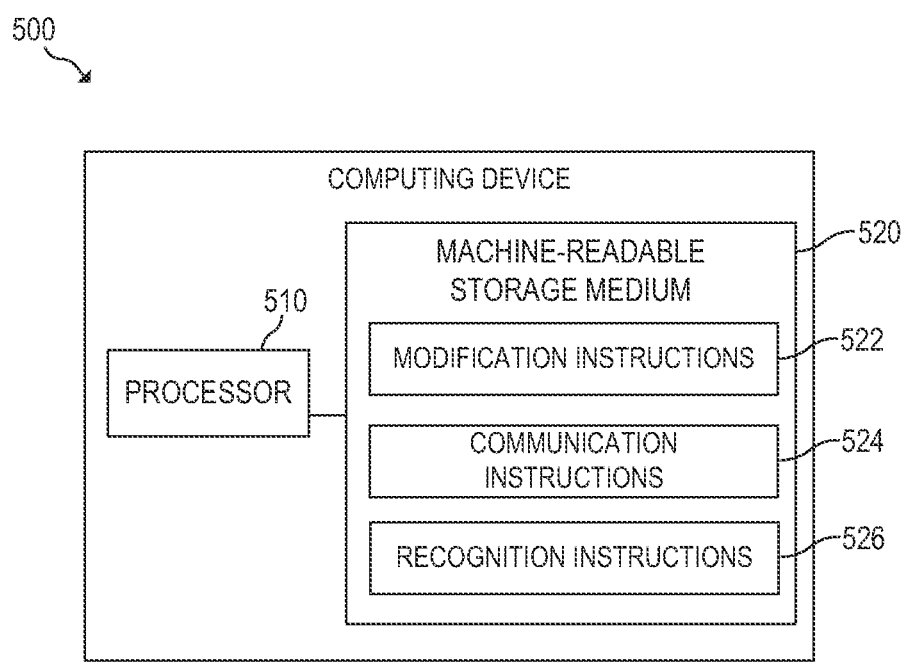
FIG. 5 is a block diagram of a computing device capable of modifying an application under test in response to actions of a security test based on safety, according to one example.

FIG. 5 is a block diagram of a computing device capable of modifying an application under test in response to actions of a security test based on safety, according to one example. The computing device 500 includes, for example, a processor 510, and a machine-readable storage medium 520 including instructions 522, 524, 526, for modifying execution of an application under test based on whether a portion of the code to be executed is safe. Computing device 500 may be, for example, a notebook computer, a desktop computer, a server, a workstation, or any other computing device. In certain examples, the computing device 500 can be used to implement one or more features of server 120.

Processor 510 may be at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), or combinations thereof. Processor 510 may fetch, decode, and execute instructions 522, 524, 526 to implement modify execution of an AUT based on a determination of the safety of the code to be executed, for example, as in method 400. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for implementing method 400.

The processor 510 can execute instructions to host an AUT. In some examples, the AUT can be compiled with a flag set to enable debugging/observing code to be executed. In other examples, the AUT can execute in a runtime environment that can perform the debugging/observing. A security test, for example, a penetration test or scan, can be performed on the AUT.

Communication instructions 524 can be used to communicate with the security test. As such, the computing device 500 can receive communications from a computing device hosting the security test. These communications can be used to cause execution of parts (e.g., functions, APIs, portions of code, etc.) of the AUT in response.

During execution of the AUT, recognition instructions 526 can be executed to determine whether portions of code are safe. The recognition instructions 526 can cause the processor 510 to determine, for example, at a real-time modifier, that a portion of a function executed by the AUT is unsafe.

In one example, the determination that the portion is unsafe is based on a type of process associated with the portion (e.g., a file delete, an external communication, etc.). Examples of unsafe processes can include at least one of a delete of a database record, a modification of a database record, polluting a database, sending an outgoing message, and exhausting resources of the computing device 500. In another example, the determination that the portion is unsafe can be based on an API called by the function as described above.

Modification instructions 522 can be executed to modify, by the real-time modifier, an execution of the AUT to not execute the portion determined to be unsafe. Further, in some examples, the real-time modifier can emulate the function without performing the portion of the function that is deemed unsafe. Moreover, the computing device 500 can generate and keep track of vulnerabilities that may be associated with the unsafe portions of code. In certain scenarios, the computing device 500 can report one or more vulnerabilities associated with the portion to the security test.

With the above approaches, a real-time modifier prevents an AUT from damaging itself and/or its partners in the course of a dynamic security scan or other security test by excluding damaging code from execution, while keeping the original application logic intact. Further, this approach can prevent attempted communication with the world outside of the test bed. Moreover, the approaches can eliminate additional manual and/or automatic maintenance of the application's state and environment by keeping the environment intact.

What is claimed is:

1. A computing system comprising:
a hardware server coupled to a computing device, the hardware server to host an application under test in a testing environment, wherein the hardware server includes instructions executable by the hardware server to:
determine that a function to be executed by the application under test includes a vulnerability and prevent a portion of the function that includes the vulnerability from being executed;
identify instructions associated with an application programming interface (API) called by the application under test that include the vulnerability; and
modify the execution of the application under test by substituting the identified instructions with instructions associated with a different API.

2. The computing system of claim 1, wherein the hardware server includes instructions executable by the hardware server to:
recognize whether the function includes the vulnerability.

3. The computing system of claim 1, wherein the instructions to determine that the function includes the vulnerability include instructions to determine that the function includes the vulnerability based on a type of process to be performed by the portion of the function.

4. The computing system of claim 3, wherein the type of process is at least one of the following:
a process to delete a database record;
a process to modify another database record;
a process to pollute a database;
a process to send an outgoing message; and
a process to exhaust resources of the hardware server.

5. The computing system of claim 1, wherein the instructions to determine that the function includes the vulnerability include instructions to:
determine that the function includes the vulnerability based on an application programming interface called by the function.

6. The computing system of claim 1, wherein the hardware server includes instructions executable by the hardware server to:
emulate the function without performing the portion of the function that includes the vulnerability.

7. The computing system of claim 1, wherein the instructions to prevent the portion of the function that includes the vulnerability from being executed include instructions to block the portion from being executed.

8. The computing system of claim 1, further including instructions executable by the hardware server to:
report the vulnerability associated with the portion to a penetration test executed by the computing device.

9. A non-transitory machine-readable storage medium storing instructions that, if executed by a hardware processor of a device, cause the device to:
receive communications from a computing device communicatively coupled to an application under test hosted using a real-time modifier to perform a security test on the application under test;
determine, by the real-time modifier, that a portion of a function to be executed by the application under test includes a vulnerability;
modify, by the real-time modifier, an execution of the application under test to prevent execution of the portion;
identify, by the real-time modifier, instructions associated with an application programming interface (API) called by the application under test that include the vulnerability; and
modify the execution of the application under test by substituting, by the real-time modifier, the identified instructions with instructions associated with a different API.

10. The non-transitory machine-readable storage medium of claim 9, further comprising instructions that, if executed by the hardware processor, cause the device to:
determine that the portion includes the vulnerability based on a type of a process associated with the portion,
wherein the type of the process performs at least one of the following:
delete a database record, modify another database record, pollute a database, send an outgoing message, and exhaust resources of the device.

11. The non-transitory machine-readable storage medium of claim 9, further comprising instructions that, if executed by the hardware processor, cause the device to:
determine that the portion includes the vulnerability based on an application programming interface called by the function,
wherein the real-time modifier emulates the function without performing the portion of the function that includes the vulnerability.

12. The non-transitory machine-readable storage medium of claim 9, further comprising instructions that, if executed by the at least one processor, cause the device to:
report the vulnerability associated with the portion to the security test,
wherein the security test is a penetration test.

13. A method comprising:
hosting an application under test using a real-time modifier on a server;
receiving communications from a computing device communicatively coupled to the application under test to perform a security test on the application under test;
determining, by the real-time modifier, that a portion of a function to be executed by the application under test includes a vulnerability based on a type of activity caused by the portion;
modifying, by the real-time modifier, an execution of the application under test to prevent execution of the portion;
identifying instructions associated with an application programming interface (API) called by the application under test that include the vulnerability; and
modifying the execution of the application under test by substituting the identified instructions with instructions associated with a different API.

14. The method of claim 13, further comprising:
emulating a functionality of the portion to provide a response to the security test.

15. The method of claim 14, further comprising:
reporting the vulnerability caused by the portion to the security test.

16. The system of claim 1, further including instructions executable by the hardware server to modify behavior of the application under test in response to the determined vulnerability.

17. The system of claim 16, wherein the behavior is modified in an application associated with the application under test, during runtime of the application.

18. The system of claim 1, further including instructions executable by the hardware server to monitor a plurality of application programming interfaces (APIs) called by the application under test.

19. The system of claim 1, wherein the instructions to prevent the portion of the function from being executed include instructions executable by the hardware server to prevent a portion of instructions associated with the vulnerability from being called.

* * * * *